United States Patent
Matsunaga (10) Patent No.: US 11,932,239 B2
(45) Date of Patent: Mar. 19, 2024

(54) DRIVING ASSISTANCE METHODS, DRIVING ASSISTANCE APPARATUS, DRIVING ASSISTANCE SYSTEMS, AND COMPUTER PROGRAM

(71) Applicant: TOYOTA JIDOSHA KABUSHIKI KAISHA, Toyota (JP)

(72) Inventor: Issei Matsunaga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/702,151

(22) Filed: Mar. 23, 2022

(65) Prior Publication Data

US 2022/0306086 A1  Sep. 29, 2022

(30) Foreign Application Priority Data

Mar. 26, 2021 (JP) .................... 2021-053706

(51) Int. Cl.
*H04N 5/44* (2011.01)
*B60W 30/06* (2006.01)
*B60W 30/18* (2012.01)
*B60W 40/09* (2012.01)

(52) U.S. Cl.
CPC ...... *B60W 30/06* (2013.01); *B60W 30/18109* (2013.01); *B60W 40/09* (2013.01); *B60W 2420/42* (2013.01)

(58) Field of Classification Search
CPC .......... B60W 30/06; B60W 30/18109; B60W 40/09; B60W 2420/42; B60K 2370/176; B60K 2370/179; B60K 2370/55
See application file for complete search history.

(56) References Cited

U.S. PATENT DOCUMENTS

| | | | | |
|---|---|---|---|---|
| 5,845,725 A * | 12/1998 | Kawada | ............... | G05D 1/0289 340/902 |
| 2007/0053551 A1* | 3/2007 | Kubo | ....................... | B60R 1/00 382/106 |
| 2009/0033540 A1* | 2/2009 | Breed | ..................... | G08G 1/163 701/472 |
| 2013/0085637 A1* | 4/2013 | Grimm | .............. | B62D 15/0285 701/25 |
| 2014/0270379 A1* | 9/2014 | Snider | ....................... | B60R 1/00 382/104 |
| 2015/0066329 A1* | 3/2015 | Mielenz | .................. | G08G 1/00 701/93 |
| 2015/0199806 A1* | 7/2015 | Tseng | ....................... | G06T 7/70 382/104 |

(Continued)

FOREIGN PATENT DOCUMENTS

JP  2016-122439 A  7/2016
WO  2018/189770 A1  10/2018

*Primary Examiner* — Munear T Akki
(74) *Attorney, Agent, or Firm* — Dinsmore & Shohl LLP (57) ABSTRACT

A driving support method supports driving of a vehicle from outside of the vehicle using images captured by a camera installed outside of the vehicle. The driving support method includes a recognition step of recognizing a shielding area that is an area in which a vehicle is shielded by a shield within an imaging range of the camera based on the images, and a control step of controlling the behavior of the vehicle by giving a predetermined command to the vehicle when a shielding area is present on traveling path of the vehicle.

10 Claims, 4 Drawing Sheets

(56) References Cited

U.S. PATENT DOCUMENTS

| | | | |
|---|---|---|---|
| 2016/0155334 A1 | 6/2016 | Jansson et al. | |
| 2018/0328750 A1* | 11/2018 | Yun | G08G 1/143 |
| 2018/0364728 A1* | 12/2018 | Yaldo | G06Q 10/20 |
| 2019/0241158 A1* | 8/2019 | Ghannam | G05D 1/0238 |
| 2020/0072619 A1 | 3/2020 | Fukui | |
| 2020/0324761 A1* | 10/2020 | Magzimof | G08G 1/166 |

* cited by examiner

DRIVING ASSISTANCE METHODS, DRIVING ASSISTANCE APPARATUS, DRIVING ASSISTANCE SYSTEMS, AND COMPUTER PROGRAM

CROSS-REFERENCE TO RELATED APPLICATIONS

This application is based upon and claims the benefit of priority of the prior Japanese Patent Application No. 2021-053706, filed on Mar. 26, 2021, the entire contents of which are incorporated herein by reference.

BACKGROUND

1. Technical Field

The present disclosure relates to the technical field of driving support methods, driving support apparatus, and driving support systems and computer programs for supporting driving of a vehicle from outside of the vehicle.

2. Description of the Related Art

The following technique is described in JP 2016-122439 A. Using a plurality of radar sensors arranged around an intersection, an object including a vehicle approaching the intersection is detected and its trajectory is calculated. Then, switching of one or more traffic signals is delayed when there is a high likelihood that objects will collide with each other.

Actual roads may include, for example, street trees, parked vehicles, and the like. Due to these objects, sensors may not be able to detect a traveling vehicle or the like that is a detection target. In the technique described in JP 2016-122439 A, this point is not considered, and there is room for improvement.

SUMMARY

The present disclosure has been made in view of the above problems. The object of the present disclosure is to provide a driving support method, an apparatus assisting system, and a computer program that can safely drive the vehicle even when there is a possibility that the vehicle as a support target cannot be recognized.

A driving support method according to an aspect of the present disclosure is a driving support method that supports driving of a vehicle from outside of the vehicle using an image captured by a camera installed outside of the vehicle. The driving support method comprises a recognition step of recognizing a shielding area that is an area in which the vehicle is shielded by a shield within the imaging range of the camera based on the image; and a control step of controlling the behavior of the vehicle by giving a predetermined command to the vehicle when shielding area is present on traveling path of the vehicle.

A driving support apparatus according to an aspect of the present disclosure is a driving support apparatus for supporting driving of the vehicle from outside of the vehicle using an image captured by a camera installed outside of the vehicle. The driving support apparatus comprises a recognition unit configured to recognize shielding area that the vehicle is shielded by a shield within the imaging range of the camera based on the image, and a control unit configured to control the behavior of the vehicle by giving a predetermined command to the vehicle when traveling path of the vehicle is present.

A driving support system according to an aspect of the present disclosure includes a driving support apparatus for supporting driving of the vehicle from outside of the vehicle using an image captured by a camera installed outside of the vehicle, and a vehicle-side apparatus mounted on the vehicle. The driving support apparatus comprises a recognition unit configured to recognize a shielding area that is an area in which the vehicle is shielded by a shield within the imaging range of the camera based on the image, and a control unit configured to control the behavior of the vehicle by giving a predetermined command to the vehicle when the shielding area is present on traveling path of the vehicle. The vehicle-side apparatus is to control the behavior of the vehicle according to the predetermined command.

A non-transitory computer readable medium according to an aspect of the present disclosure includes a computer program that causes a controller of a driving support apparatus that supports driving of a vehicle from outside of the vehicle using an image captured by a camera installed outside of the vehicle to recognize a shielding area which is an area in which the vehicle is shielded by a shield within the imaging range of the camera based on the image, and control the behavior of the vehicle by giving a predetermined command to the vehicle when the shielding area is present on a traveling path of the vehicle.

DETAILED DESCRIPTION OF THE EMBODIMENT

The embodiment according to a driving support method will be described with reference to FIGS. 1 to 6. In the present embodiment, a driving support method for supporting driving of the vehicle traveling in the parking lot will be described. Vehicles that are supported by driving support methods shall be self-propelled (i.e., capable of traveling regardless of the operation of driving operators). Incidentally, the vehicle may be occupied by a driving person.

Studies on automated valet parking (AVP) are under way. For example, a relatively large number of sensors must be mounted on the vehicle in an attempt to realize automatic valet parking only by the vehicle's self-propelled functions. Then, the cost per vehicle increases. Therefore, the popularization of vehicles capable of automatic valet parking is delayed, and thus, the popularization of automatic valet parking may also be delayed.

In contrast, an infrastructural-coordinated automatic valet parking system has been proposed that supports driving of vehicles using, for example, information obtained from images of cameras installed in a parking lot. In the infrastructure cooperative type automatic valet parking, the vehicle can be safely self-propelled even when the number of sensors mounted on the vehicle is comparatively small. Therefore, it can be expected that the cost reduction per vehicle and the promotion of the popularization of automatic valet parking can be promoted for the automatic valet parking of the infrastructure cooperative type.

Incidentally, for example, when tree branches and leaves grow, extended branches and leaves may be included in the camera's field of view (in other words, imaging range). Alternatively, the construction vehicle or fence or the like may be included in the field of view of the camera due to inspection or construction of the parking lot. Then, there is a possibility that it is impossible to detect the target vehicle from the image of the camera by the presence of trees or the like between the camera and the target vehicle to support.

Figure 1:
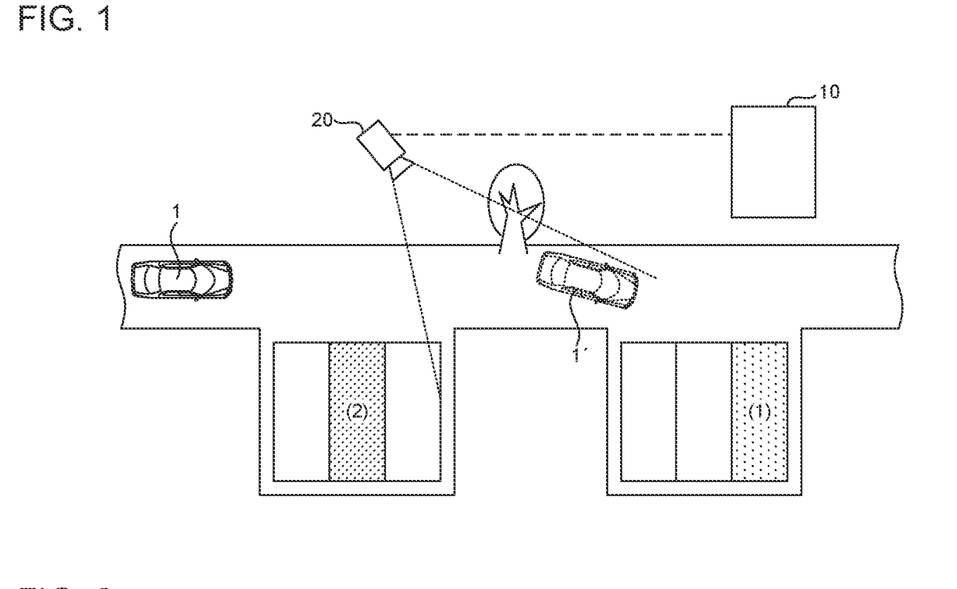
FIG. 1 is a diagram illustrating an exemplary scene in which a driving support method according to the embodiment is applied.

The following is a practical example. Consider a case where the vehicle 1 as the target vehicle travels toward the parking space (1) of FIG. 1. As shown in FIG. 1, there is a tree within the field of view of the camera 20 (see dotted lines extending from the camera 20). Then, it is necessary for the vehicle 1 to pass through the vicinity of the tree in order to reach the parking space (1). At this time, when the vehicle 1 enters the shadow of the tree (see vehicle 1'), the camera 20 is unable to image the vehicle 1 by the presence of tree. As a result, the vehicle 1 is not detected.

At this time, there is a possibility that the safety of the target vehicle is reduced when the support to the target vehicle is interrupted. Therefore, in the driving support method, a shielding area that is an area in which the target vehicle is shielded by a shield such as a tree within the field of view of the camera (e.g., camera 20) is recognized in advance. Then, in the driving support method, a predetermined command is given to the target vehicle as traveling path support when the shielding area is present on the traveling path of the target vehicle, thereby controlling the behavior of the target vehicle.

The predetermined command may be a deceleration command. This deceleration command may be realized by reducing the target vehicle speed of the target vehicle. The degree of deceleration indicated by the deceleration command may increase as the shielding area increases. The predetermined command may be a stop command. The predetermined command may be a traveling path change command that changes the traveling path of the target vehicle to a new path that does not pass through the shielding area. The predetermined command may be a target change command to change the target point of the target vehicle to a new target point that can be reached without passing through the shielding area.

Figure 2:
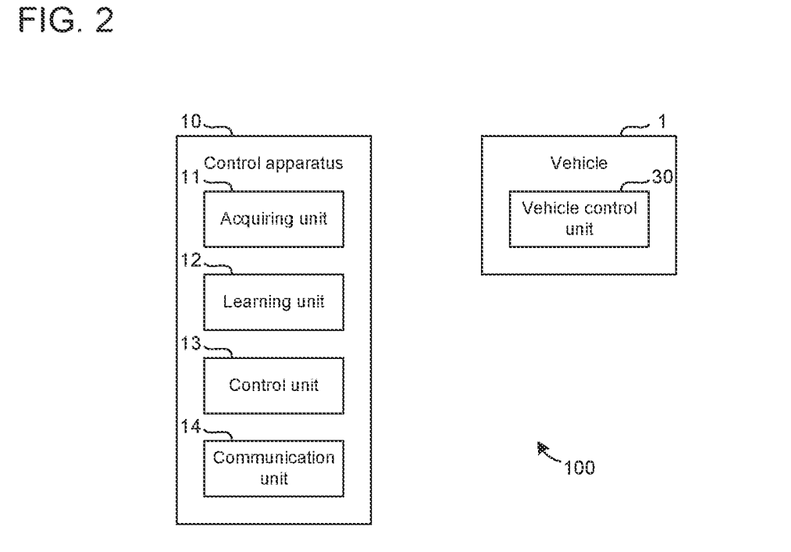
FIG. 2 is a block diagram showing a configuration of a driving support system according to the embodiment.

Here, a driving support system 100 is exemplified as an exemplary specific configuration for realizing the driving support method. In FIGS. 1 and 2, the driving support system 100 includes a control apparatus 10 that is an apparatus of the parking lot side, a camera 20 installed in the parking lot, and the vehicle 1 (i.e., the target vehicle of the support) configured to include a vehicle control unit 30 mounted on. Incidentally, the parking lot, in addition to the camera 20, one or more other cameras may be installed.

Further, in addition to the camera, a different type of sensor than the camera such as LiDAR (Light Detection and Ranging) may be installed.

The control apparatus 10 is configured to include an acquiring unit 11, a learning unit 12, a control unit 13, and a communication unit 14 as processing blocks that are logically realized therein or as processing circuits that are physically realized therein. The acquiring unit 11 acquires an image captured by the camera 20. The learning unit 12 learns or recognizes a shielding area based on the images acquired by the acquiring unit 11. The control unit 13 generates information for supporting the vehicle 1 (e.g., target point, target traveling path, target velocity, etc.). In particular, when the shielding area learned by the learning unit 12 is present on the traveling path of the vehicle 1, the control unit 13 generates information indicating a predetermined command in order to control the behavior of the vehicle 1. Communications unit 14 transmits the information generated by the control unit 13 to the vehicle control unit 30 of the vehicle 1. The vehicle control unit 30, based on the information transmitted from the control apparatus 10, controls the vehicle 1 to self-propel the vehicle 1.

Figure 3:
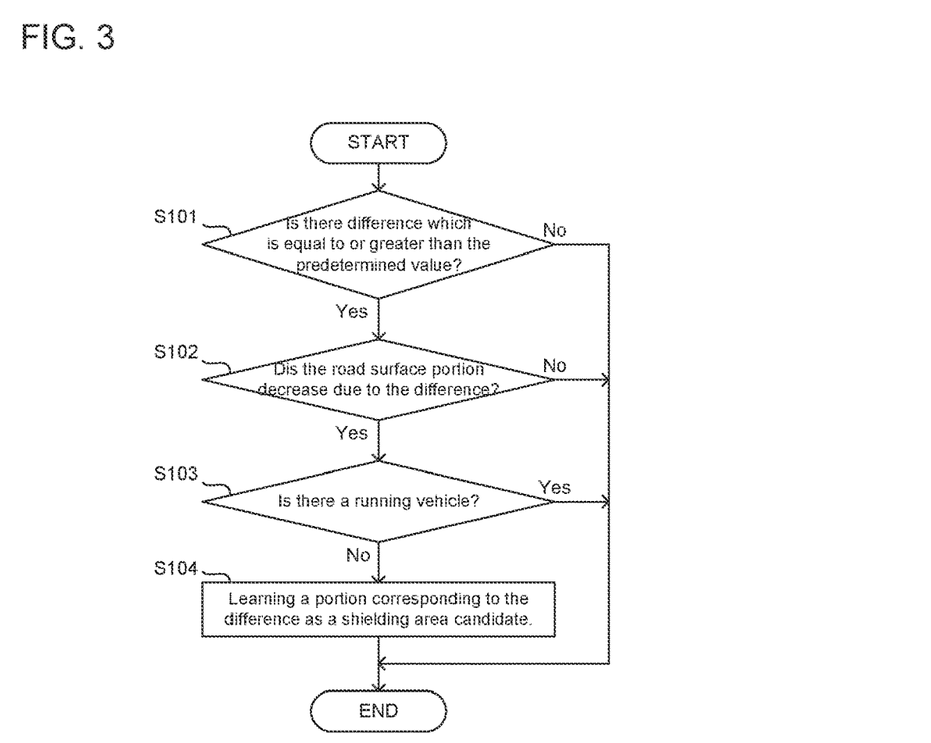
FIG. 3 is a flowchart showing a part of a driving support method according to the embodiment.
Figure 4:
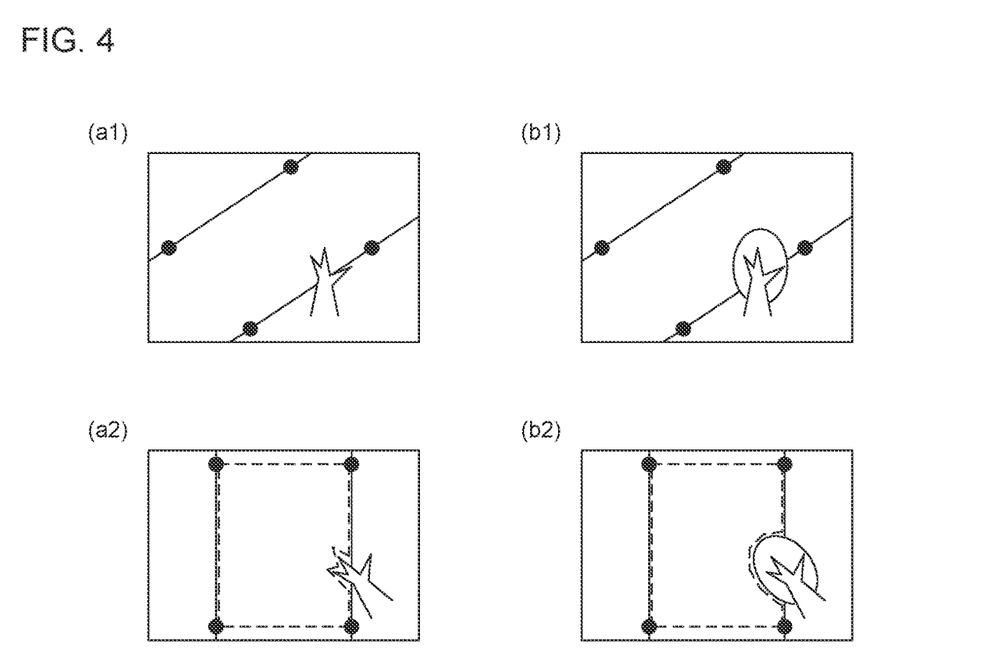
FIG. 4 is a diagram showing an example of a method of determining the area of a road surface.

The learning of shielding area by the learning unit 12 will be described with reference to FIGS. 3 to 5. In FIG. 3, the learning unit 12 compares one image acquired by the acquiring unit 11 with a past image that is an image captured by the camera 20 before the one image. A description will be added with reference to FIG. 4 for comparison between one image and the past image. FIG. 4 (a1) is an example of a past image, and FIG. 4 (b1) is an example of a current image.

The learning unit 12 obtains a correspondence relationship (e.g., a corresponding point) between the past image and the map. Black circles in FIG. 4 (a1) correspond to the corresponding points. The learning unit 12 converts the past image shown in FIG. 4 (a1) into an image shown in FIG. 4 (a2), for example, based on the determined correspondence relationship. The learning unit 12 calculates an area of a road surface portion (a portion surrounded by a broken line) in the image shown in FIG. 4 (a2).

Similarly, the learning unit 12 obtains a correspondence relationship between the current image and a map. Black circles in FIG. 4 (b1) correspond to the corresponding points. The learning unit 12 converts the current image shown in FIG. 4(b1) into an image shown in FIG. 4(b2), for example, based on the requested correspondence relationship. The learning unit 12 calculates an area of a road surface portion (a portion surrounded by a broken line) in the image shown in FIG. 4 (b2).

Next, the learning unit 12 compares the entire current image with the entire past image to determine whether or not the difference between the two is equal to or greater than a predetermined value (step S101). In processing of the step S101, when the difference is determined to be less than a predetermined value (step S101: No), the operation shown in FIG. 3 is terminated. Thereafter, after a predetermined period (e.g., several tens of milliseconds to several hundred milliseconds) has elapsed, processing of the step S101 may be performed. That is, the operation shown in FIG. 3 may be repeated at a cycle corresponding to a predetermined period.

In processing of the step S101, when it is determined that the difference is equal to or greater than the predetermined value (step S101: Yes), the learning unit 12 compares the area of the road surface portion calculated from the previous image with the area of the road surface portion calculated from the current image to determine the difference between the two. At this time, as the area of the road surface portion calculated from current image is smaller than the area of the road surface portion calculated from the past image, the difference is assumed to be larger. Then, the learning unit 12 determines whether or not the road surface portion in one image has decreased in comparison with the road surface portion of the previous image (step S102). That is, it is determined whether the difference between the area of the road surface portion calculated from the past image and the area of the road surface portion calculated from the current image are positive values. In processing of the step S102, when it is determined that the road surface portion is not reduced (step S102: No), the operation shown in FIG. 3 is terminated. This is because the possibility that the variation in the parking lot that caused the above difference affects the detection of the target vehicle being traveled can be regarded as relatively low. Thereafter, after a predetermined period has elapsed, processing of the step S101 may be performed.

In processing of the step S102, when it is determined that the road surface portion is decreasing (step S102: Yes), the learning unit 12 determines whether or not there is a running vehicle within the field of view of the camera 20 (step S103). In processing of the step S103, when it is determined that there is a running vehicle (step S103: Yes), the operation shown in FIG. 3 is terminated. This is because there is a high possibility that the road surface portion is reduced by the running vehicle rather than shielding objects such as trees. Thereafter, after a predetermined period has elapsed, processing of the step S101 may be performed.

In processing of the step S103, when it is determined that there is no running vehicle (step S103: No), the learning unit 12 learns a portion corresponding to the above-described difference in one image as a shielding area candidate (step S104). Thereafter, after a predetermined period has elapsed, processing of the step S101 may be performed.

Figure 5:
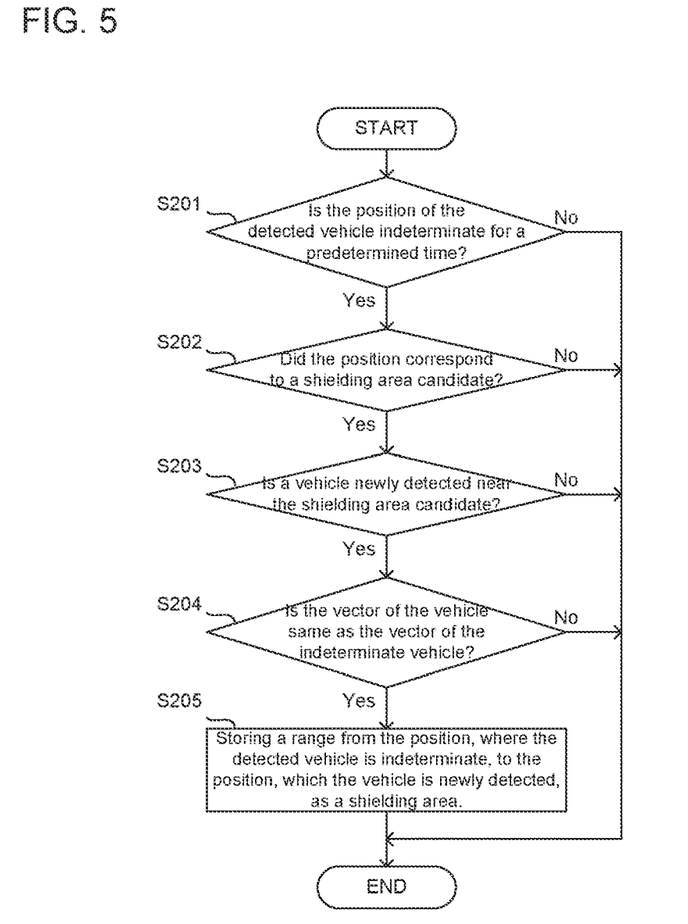
FIG. 5 is a flowchart showing another part of a driving support method according to the embodiment.

When the new shielding area candidate is learned by the operation shown in FIG. 3, the learning unit 12 performs the operation shown in FIG. 5. In the operation shown in FIG. 5, after the new shielding area candidate has been learned, a plurality of temporally consecutive images of the vehicle traveling in the field of view of the camera 20 are used. In FIG. 5, based on the plurality of images, the learning unit 12 determines whether or not the position of the vehicle detected from the images (in other words, appearing in the images) is indeterminate for a predetermined period of time (step S201). In other words, in processing of the step S201, it is determined whether or not the vehicle that has been detected up to a certain point cannot be detected in the field of view of the camera 20 for at least a predetermined time.

Here, the above-described "predetermined time" may be set as the time at which the degree of the impact on driving support becomes an allowable limit, for example, based on the relation between the time at which the position of the target vehicle cannot be specified and the degree of the impact on driving support. In processing of the step S201, when the position of the vehicle is determined not to be indeterminate for a predetermined time (step S201: No), the operation shown in FIG. 5 is terminated.

In processing of the step S201, when it is determined that the position of the vehicle is indeterminate for a predetermined time (step S201: Yes), the learning unit 12 determines whether or not the range in which the position of the vehicle was indeterminate corresponds to a shielding area candidate (step S202). In S202 of steps processing, when it is determined that the range where the position of the vehicle was indeterminate does not fall within the shielding area candidate (step S202: No), the operation shown in FIG. 5 is terminated. In this case, the position of the vehicle may become indeterminate because of the reason that is not related to a shield (e.g., the vehicle has come out of the field of view of the camera 20 by route change, etc.).

In processing of the step S202, when the range in which the position of the vehicle was undefined corresponds to the shielding area candidate (step S202: Yes), the learning unit 12 determines whether or not a new vehicle is detected near the shielding area candidate after the position of the vehicle becomes indeterminate based on the plurality of images (step S203). In processing of the step S203, when it is determined that a new vehicle is not detected (step S203: No), the operation shown in FIG. 5 is terminated.

In processing of the step S203, when it is determined that a new vehicle has been detected (step S203: Yes), the learning unit 12 determines whether or not the direction indicated by the direction vector of the vehicle whose position is indeterminate (which may be a velocity vector when the vehicle is running at a constant speed) and the direction indicated by the direction vector of the newly detected vehicle coincide (step S204). In processing of the step S204, when it is determined that both directions do not match (step S204: No), the operation shown in FIG. 5 is terminated because it is relatively likely that the path of the newly detected vehicle will be different from the path of the vehicle the position of which has become indeterminate.

In processing of the step S204, when it is determined that both directions coincide (step S204: Yes), the learning unit 12 stores a range from the position where the position of the vehicle becomes indeterminate to the position where the vehicle is newly detected (i.e., the position where the vehicle whose position became undetermined is re-detected) as shielding area (step S205).

Next, the support of driving of the target vehicle by the control unit 13 (e.g., the vehicle 1) will be described with reference to the flowchart of FIG. 6. As described above, the control unit 13 generates, for example, a destination point, a target traveling path (in other words, a temporal variation in the target steering angle), a target velocity, and the like. Here, the "target point" is not limited to the final target point, for example, may be a target point after a few seconds or the like.

Figure 6:
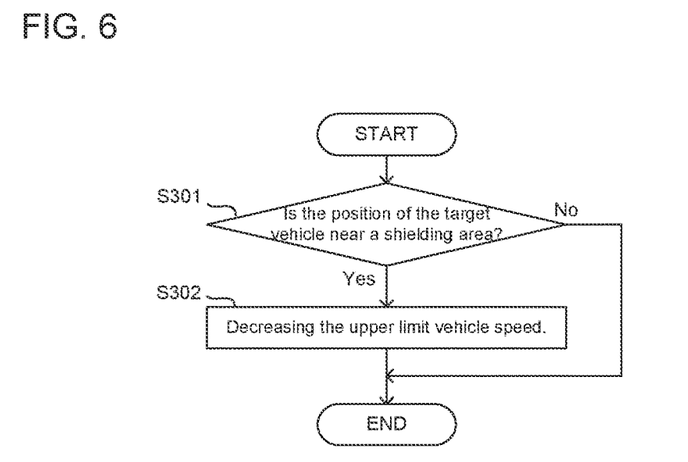
FIG. 6 is a flowchart showing another part of a driving support method according to the embodiment.

In FIG. 6, the control unit 13 determines whether or not the position of the target vehicle is near a shielding area stored by the learning unit 12 (step S301). In other words, in processing of the step S301, it is determined whether or not the shielding area is present on traveling path of the target vehicle and the target vehicle has reached the vicinity of the shielding area. In processing of the step S301, when it is determined that the position of the target vehicle is not near the shielding area (step S301: No), the operation shown in FIG. 6 is terminated. Thereafter, after a predetermined period (e.g., several tens of milliseconds to several hundred milliseconds) has elapsed, processing of the step S301 may be performed. That is, the operation shown in FIG. 6 may be repeated at a cycle corresponding to a predetermined period.

In processing of the step S301, when it is determined that the position of the target vehicle is near the shielding area (step S301: Yes), the control unit 13 lowers the upper limit vehicle speed (step S302). As a result, the target vehicle speed generated by the control unit 13 is reduced. Thereafter, after a predetermined time has elapsed, processing of the step S301 may be performed. In processing of the step S302, the control unit 13 may increase the degree of reduction (in other words, the degree of deceleration) of the target vehicle speed as the shielding area increases. Processing of this step S302 corresponds to the manner in which the deceleration command as an example of the predetermined command described above is given to the target vehicle.

The following is a practical example. Suppose the target vehicle is the vehicle 1 and its target point is the parking space (1) in FIG. 1. In this case, the control unit 13 reduces the target vehicle speed of the vehicle 1 by lowering the upper limit vehicle speed according to the vehicle 1 prior to the vehicle 1 reaching the position of the vehicle 1' (i.e., within the shielding area) by processing of the above-described step S302. Consequently, the vehicle 1 decelerates and then runs on its own on shielding area.

(Technical Effects)

In the driving support method, when a shielding area is present on traveling path of the target vehicle, the upper limit vehicle speed for the target vehicle that has reached the vicinity of the shielding area is reduced. As a result, the target vehicle will slow down and run freely on the shielding area. Therefore, even if there are objects (e.g., obstacles) in the shielding area that cannot be detected from the images of cameras and prevent the target vehicle from traveling, it can be expected that appropriate measures may be taken by the functions of the target vehicle such as, for example, crash damage mitigation braking. Thus, the driving support method can safely drive the target vehicle even when there is a possibility that the target vehicle cannot be recognized.

<Modification>

(1) Instead of processing of the step S302 of FIG. 6, the control unit 13 may change the target point of the target vehicle to a point where the vehicle can reach without passing through a shielding area. Specifically, for example, if the parking space (1) of FIG. 1 was the target point, the control unit 13 may change the target point to the parking space (2). This aspect corresponds to the manner in which the target change command as an example of the predetermined command described above is given to the target vehicle.

(2) The control unit 13 may change the target traveling path of the target vehicle to a traveling path that does not pass through a shielding area instead of processing of the step S302 of FIG. 6. This aspect corresponds to an aspect in which a path change command as an example of the predetermined command described above is given to the target vehicle.

(3) The control unit 13, instead of processing of the step S302 of FIG. 6, the target vehicle may be stopped in front of a shielding area. This aspect corresponds to the manner in which the stop command as an example of the predetermined command described above is given to the target vehicle.

Figure 7:
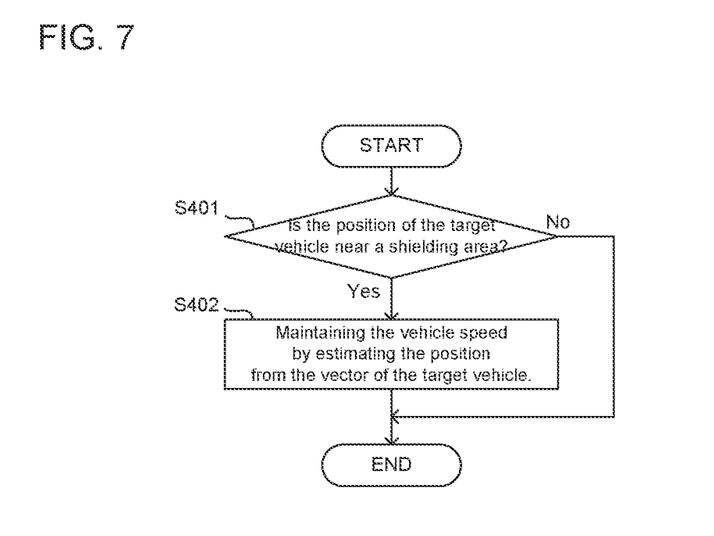
FIG. 7 is a flowchart showing a part of a driving support method according to a modification of the embodiment.

(4) The control unit 13, instead of the operation shown in FIG. 6, may perform the operation shown in FIG. 7. That is, similarly to processing of the step S301 described above, the control unit 13 determines whether or not the position of the target vehicle is near a shielding area stored by the learning unit 12 (step S401). In processing of the step S401, when it is determined that the position of the target vehicle is near the shielding area (step S401: Yes), the control unit 13 estimates the future position of the target vehicle from the vector of the target vehicle to support driving of the target vehicle (step S402). At this time, the control unit 13 maintains the target vehicle speed of the target vehicle (i.e., does not change).

<Computer Program>

Figure 8:
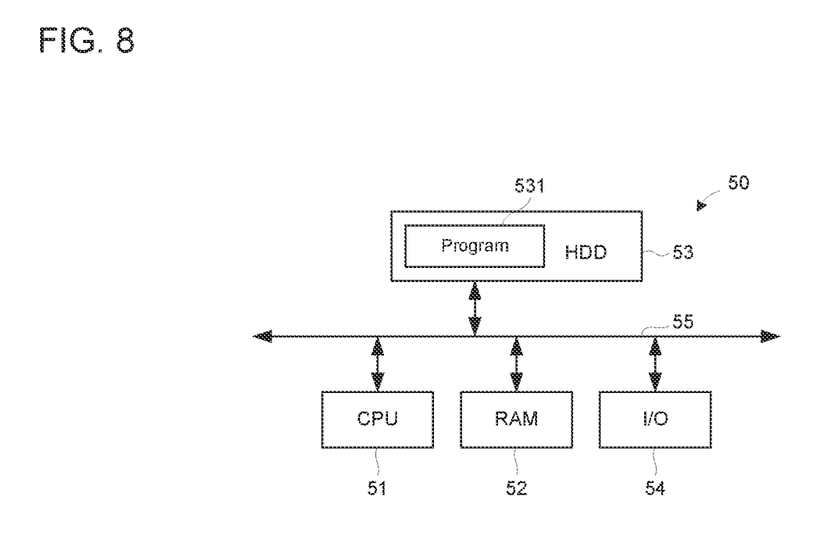
FIG. 8 is a block diagram showing a configuration of a computer according to the embodiment.

The embodiment according to the computer program will be described with reference to FIG. 8. FIG. 8 is a block diagram showing a configuration of a computer according to the embodiment.

In FIG. 8, the computer 50 is configured to include a CPU (Central Processing Unit) 51, a RAM (Random Access Memory) 52, a HDD (Hard Disk Drive) 53 and an I/O (Input/Output) 54. The CPU 51, the RAM 52, the HDD 53 and the I/O 54 are interconnected by a bus 55. The computer program 531 according to the present embodiment is stored in advance in the HDD 53. The I/O 54 may constitute at least a part of the communication unit 14 in the embodiment described above.

Processing of the CPU 51 according to the computer program 531 will be described. The CPU 51 acquires images captured by the camera 20 via the I/O 54. The CPU 51 may store the acquired image in the RAM 52 or may store the acquired image in the HDD 53. The CPU 51 learns a shielding area based on the above images. The CPU 51 stores the learned shielding area data in the HDD 53.

The CPU 51 generates information for supporting the vehicle 1 as an exemplary of the target vehicle. The CPU 51 transmits the generated data to the vehicle control unit 30 of the vehicle 1 through the I/O 54. The CPU 51, when shielding area is present on the traveling path of the vehicle 1, generates information indicating a predetermined command in order to control the behavior of the vehicle 1. The CPU 51 transmits information indicating a predetermined command, via the I/O 54, to the vehicle control unit 30 of the vehicle 1.

The computer 50 may store the computer program 531 in the HDD 53 by reading the computer program 531 from a recording medium such as an optical disk such as a CD-ROM (Compact Disc Read Only Memory) for storing the computer program 531, a USB (Universal Serial Bus) memory, or the like. Alternatively, the computer 50 may store the computer program 531 in the HDD 53 by downloading the computer program 531 via a network such as the Internet.

According to the computer program 531, similarly to the driving support method described above, even when there is a possibility that the target vehicle cannot be recognized, the target vehicle can be safely driven. According to the computer program 531, it is possible to relatively easily realize the control apparatus 10 in the embodiment described above.

Various aspects of the present disclosure derived from the embodiments and modifications described above will be described below.

The driving support method according to an aspect of the present disclosure is a driving support method that supports driving of a vehicle from outside of the vehicle using an image captured by a camera installed outside of the vehicle. The driving support method comprises a recognition step of recognizing a shielding area that is an area in which the vehicle is shielded by a shield within the imaging range of the camera based on the image; and a control step of controlling the behavior of the vehicle by giving a predetermined command to the vehicle when the shielding area is present on traveling path of the vehicle. In the above-described embodiment, the operation of the learning unit 12 corresponds to an example of the recognition process, and the operation of the control unit 13 corresponds to an example of the control process.

In the driving support methods, the predetermined command may be a deceleration command. In this aspect, the greater the shielding area, the greater the degree of deceleration indicated by the deceleration instruction. In the driving support method, the predetermined command may be a stop command. In the driving support method, the predetermined command may be a traveling path change command that changes the traveling path to a new path that does not pass through the shielding area. In the driving support method, the predetermined command may be a target change command to change the target point of the vehicle to a new target point that the vehicle can reach without passing through the shielding area.

In the driving support method, the recognizing step may recognize a shielding area candidate which is an area corresponding to the difference between one image captured by the camera and another image captured prior to the one image, and recognize the area as the shielding area when another vehicle different from the vehicle cannot be recognized from the image captured by the camera in the vicinity of the shielding area candidate.

A driving support apparatus according to an aspect of the present disclosure is a driving support apparatus that supports driving of a vehicle from outside of the vehicle using an image captured by a camera installed outside of the vehicle. The driving support apparatus comprises the recognition unit configured to recognize a shielding area that is an area in which the vehicle is shielded by a shield within the imaging range of the camera based on the image, and a control unit configured to control the behavior of the vehicle by giving a predetermined command to the vehicle when the shielding area is present on the traveling path of the vehicle. In the above-described embodiment, the control apparatus 10 corresponds to an example of driving support apparatus, and the learning unit 12 corresponds to an example of the recognition unit.

The driving support system according to an aspect of the present disclosure includes a driving support apparatus for supporting the vehicle from outside of the vehicle using an image captured by a camera installed outside of the vehicle, and a vehicle-side apparatus mounted on the vehicle. The driving support apparatus includes a recognition unit configured to recognize a shielding area that is an area in which the vehicle is shielded by a shield within the imaging range of the camera based on the image, and a control unit configured to control the behavior of the vehicle by giving a predetermined command to the vehicle when the shielding area is present on the traveling path of the vehicle. The vehicle-side apparatus is to control the behavior of the vehicle according to the predetermined command. In the embodiment described above, the vehicle control unit 30 corresponds to an example of the vehicle-side apparatus.

According to an aspect of the present disclosure, non-transitory computer readable medium including comprising a computer program that causes a controller of a driving support apparatus that supports driving of a vehicle from outside of the vehicle using images captured by a camera installed outside of the vehicle to recognize a shielding area that is an area in which the vehicle is shielded by a shield within an imaging range of the camera based on the images, and control behavior of the vehicle by giving a predetermined command to the vehicle when the shielding area is present on traveling path of the vehicle.

The present disclosure is not limited to the embodiments described above. The present disclosure can be appropriately modified in a range that does not contrary to the claimed range and the inventive summary or philosophy that can be read from the entire specification. Driving support methods, driving support apparatus, driving support systems and computer programs with such modifications are also included in the present disclosure technical range.

What is claimed is:

1. A driving support method for assisting driving of a vehicle from outside of the vehicle using images captured by a camera unattached to the vehicle and installed outside of the vehicle, the driving support method comprising:

a recognition step of recognizing, by a central processing unit, a shielding area that is an area in which the vehicle is shielded by a shield within an imaging range of the camera based on the images; and a control step of controlling, by the central processing unit, behavior of the vehicle by giving a predetermined command to the vehicle when the shielding area is present on a traveling path of the vehicle.

2. The driving support method according to claim 1, wherein the predetermined command is a deceleration command.

3. The driving support method according to claim 2, wherein the degree of deceleration indicated by the deceleration command increases as the shielding area increases.

4. The driving support method according to claim 1, wherein the predetermined command is a stop command.

5. The driving support method according to claim 1, wherein the predetermined command is a path change command which changes the traveling path to a new traveling path that does not pass through the shielding area.

6. The driving support method according to claim 1, wherein the predetermined command is a target change command that changes a target point of the vehicle to a new target point that the vehicle reaches without passing through the shielding area.

7. The driving support method according to claim 1, wherein the recognition step recognizes a shielding area candidate that is an area corresponding to the difference between one image captured by the camera and another image captured prior to the one image, and recognizes the area as the shielding area if another vehicle, which is different from the vehicle, cannot be recognized from the image captured by the camera in the vicinity of the shielding area candidate.

8. A driving support apparatus for supporting driving of a vehicle from outside of the vehicle using images captured by a camera unattached to the vehicle and installed outside of the vehicle, the driving support apparatus comprising a central processing unit configured to:

recognize a shielding area that is an area in which the vehicle is shielded by a shield within an imaging range of the camera based on the image, and control behavior of the vehicle by giving a predetermined command to the vehicle when the shielding area is present on a traveling path of the vehicle.

9. A driving support system comprising a driving support apparatus for supporting driving of a vehicle from outside of the vehicle using images captured by a camera unattached to the vehicle and installed outside of the vehicle and a vehicle-side apparatus mounted on the vehicle, wherein the driving support apparatus comprises a central processing unit configured to:

recognize a shielding area that is an area in which the vehicle is shielded by a shield within an imaging range of the camera based on the images, and control behavior of the vehicle by giving a predetermined command to the vehicle when the shielding area is present on a traveling path of the vehicle, the vehicle-side apparatus controls the behavior of the vehicle according to the predetermined command.

10. A non-transitory computer readable medium including comprising a computer program that causes a controller of a driving support apparatus that supports driving of the vehicle from outside of the vehicle using images captured by a camera unattached to the vehicle and installed outside of the vehicle to perform at least the following when executed:

recognize an shielding area that is an area in which the vehicle is shielded by a shield within an imaging range of the camera based on the images; and control behavior of the vehicle by giving a predetermined command to the vehicle when the shielding area is present on a traveling path of the vehicle.

\* \* \* \* \*